Patented Feb. 16, 1954

2,669,590

UNITED STATES PATENT OFFICE 2,669,590

PRODUCTION OF FLUORINE COMPOUNDS

Charles B. Miller, Lynbrook, N. Y., and Lee B. Smith, Woodbridge, N. J., assignors to Allied Chemical & Dye Corporation, New York, N. Y., a corporation of New York No Drawing. Application August 3, 1951,
Serial No. 240,293

11 Claims. (Cl. 260—653)

This invention relates to hydrohalogenation of olefinic compounds, more specifically to the preparation of fluorinated ethanes, i. e. saturated two carbon atom compounds, one of said carbon atoms being attached to two fluorine atoms, by the addition of HF to the double bond of two carbon atom olefinic materials containing the $=CF_2$ group, such products being utilizable as chemical intermediates and in the refrigeration field.

Prior art methods for effecting addition of HF to the double bond of two carbon atom olefinic materials have involved use of such catalysts as mercury compounds or boron trifluoride, or have required operation at high pressures in order to obtain substantial yields. The difficulty of preparation of the previously proposed mercury catalyst, the corrosiveness of the $BF_3$ catalyst and the higher pressures necessitated in the absence of any catalyst have constituted serious limitations of such prior art methods for hydrofluorination of olefins.

A significant object of the present invention is to develop a flexible high yield and easily operated method for bringing about addition of HF to the olefinic double bond and, in particular, to present a highly active and easily prepared catalytic material for facilitating such reaction.

According to the discovery of the present invention, a gaseous mixture of a two carbon atom olefin containing the $=CF_2$ group, and HF is contacted with non-crystalline aluminum fluoride catalyst more fully described below, under conditions of temperature and pressure which bring about addition of HF to the olefinic double bond and resultant production of a sought-for fluorinated ethane.

The starting materials of the present invention, as indicated above, are derivatives of ethylene, i. e. contain two carbon atoms bound by a double linkage, the hydrogen of one of said carbon atoms being completely substituted by fluorine. Of the above described olefinic starting materials, vinylidene fluoride, $CH_2=CF_2$, or chlorovinylidene fluoride, $CHCl=CF_2$, are preferred. When $CH_2=CF_2$ is employed as starting material, $CH_3CF_3$, a 1,1,1-trifluoroethane, is the main product, yield (product recovery based on $CH_2=CF_2$ converted), under proper conditions being almost quantitative. The overall reaction may be represented as follows:

$$CH_2=CF_2 + HF \rightarrow CH_3CF_3$$

When the reactant is $CHCl=CF_2$, yields of

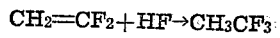

another 1,1,1-trifluoroethane, approaching quantitative may be obtained. However, the scope of the invention is not limited to these preferred starting materials, other suitable reactants including chlorotrifluoroethylene, $CClF=CF_2$ and dichlorovinylidene fluoride, $CCl_2=CF_2$, as well as corresponding bromine derivatives. As indicated below, the choice of starting material may have some bearing upon reaction conditions, particularly operating temperature and pressure. In each case, reaction is carried out completely in the gas phase and presence of even small quantities of liquid reactant or product is avoided.

Our catalyst should be distinguished from the many types of aluminum fluorides known in the art. The majority of known materials consists of lumps or smaller discrete particles, which lumps or particles in turn are composed of $AlF_3$ crystals of relatively large size, i. e. not less than one thousand and usually several thousand Angstrom units radius and above as in the case of commercial types of aluminum fluorides available on the market. However, certain forms of $AlF_3$, when examined even by the highest powered optical microscope, appear to be of non-crystalline or "amorphous" structure. When such "amorphous" aluminum fluorides are examined using X-ray diffraction technique, extremely small, sub-microscopic crystals, "crystallites," may be detected. According to the invention, such "amorphous" aluminum fluorides, having crystals of certain sub-microscopic (crystallite) size, are used in the hydrohalogenation of olefins. Enhanced catalytic activity may be noted by use of aluminum fluorides of crystallite size of about 500 Å. radius or below. As crystallite size decreases below this value, desired catalytic activity increases and particularly suitable aluminum fluorides include those having crystallite size of about 200 Å. and below (as determined by X-ray diffraction technique). It has been found that by contacting the olefins described with the improved catalyst, transformation to fluorinated ethanes may be realized under favorable and easily maintained operating conditions. Although advantageous catalytic properties realized in practice of the invention are peculiar to crystallites, such properties are not destroyed but merely diluted by the presence of larger crystals.

Aluminum fluorides having the indicated crystallite size and catalytic activity are included within the scope of the invention regardless of method of preparation. However, according to a particular embodiment of the invention, improved catalytic material is employed which is prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, catalyst may be prepared by treating solid hydrated aluminum halide with gaseous fluorinating agent (said agent being preferably, but not necessarily, anhydrous) at temperature high enough so that the water in the hydrate is volatilized into the gas, e. g. preferably above about 100° C to 170° C., the maximum temperature for avoiding fusion depending largely upon the degree of hydration of the reactant and the water content, if any, of the fluorinating agent. If desired, anhydrous reagents may be employed, in which case maintenance of elevated temperatures during the catalyst preparation reaction is not as critical and said reaction may be carried out with fluorinating agent in the liquid phase. Of the fluorinating agents which may be used for catalyst preparation, moron trifluoride and hydrofluoric acid may be mentioned. We prefer anhydrous hydrofluoric acid. Anhydrous aluminum chloride is the preferred halide, in which case catalyst synthesis reaction is believed to proceed as follows:

$$3HF + AlCl_3 = AlF_3 + 3HCl$$

HF displaces HCl causing transformation of $AlCl_3$ into $AlF_3$. The remaining aluminum fluoride may be activated by heating in an anhydrous atmosphere at elevated temperature, i. e. temperature at which activation takes place (presumably accompanied by vaporization and removal of any amounts of water of hydration). The finished catalyst is then recovered. We have found that heating the $AlF_3$ in a stream of dry nitrogen or HF gas for about one to four hours at temperatures of about 300–350° C. for four to six hours at 250–300° C. is ordinarily suitable for this purpose.

If desired, the catalyst may be activated by heating the $AlF_3$ in a stream of free oxygen-containing gas such as oxygen or air at about 400–600° C. for approximately 30 minutes to six and one-half hours (depending mostly on the $O_2$ content of the treatment gas), in which case activation with dry nitrogen of HF gas as aforesaid, may be omitted. Catalyst so activated with free oxygen gas has particularly enhanced activity for hydrohalogenation of olefins. Hence, preferred procedure for activation of $AlF_3$ to be used as hydrohalogenation catalyst comprises such treatment.

Although not essential to realization of the objects of the invention, a suitable and convenient procedure for preparing the aluminum fluoride catalyst is to add solid anhydrous aluminum chloride to an excess of liquefied anhydrous hydrofluoric acid in a cooled container and, after complete addition of the aluminum chloride, mildly to agitate the mixture until reaction is substantially complete. The $AlF_3$ so prepared is then activated as outlined above. Following, is an example illustrating preparation of $AlF_3$ catalyst according to the latter procedure. Parts and percentages are by weight, unless otherwise indicated.

Example A 300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% $AlF_3$ content and containing less than 0.15% chlorine were recovered. This $AlF_3$ was heated in a stream of dry inert gas (nitrogen) at a sufficiently elevated temperature (250–300° C.) and a period of time sufficiently long (4–6 hours) to drive off residual amounts of water and activate the material. An X-ray diffraction pattern of material prepared according to the method outlined above indicated crystallite size to be less than 100 Angstrom units radius, i. e. the crystallite size was so small as to be indicative of "amorphous" structure as desired for the purpose of the present invention. The mesh size distribution of the $AlF_3$ particles did not change appreciably during the heat treatment.

As indicated prior to the above example a particular procedure utilizing HF gas as fluorinating agent for the $AlCl_3$ comprises treating anhydrous $AlCl_3$ or $AlCl_3$ hydrate with HF gas (preferably anhydrous) at temperature sufficiently high to cause reaction between $AlCl_3$ and HF and to volatilize and maintain any water present in the system in the gas phase (preferably 100°–170° C. in case the hydrate is employed), but low enough to prevent excessive volatilization of $AlCl_3$ (below about 125° C. when anhydrous $AlCl_3$ is treated), and thereafter activating the $AlF_3$ produced. Aluminum fluoride so prepared has also been found to be composed of crystallites of size substantially below 200 Å. as desired for hydrohalogenation of olefins according to a preferred embodiment of the invention. Gas phase preparation of catalyst is illustrated by the following example in which parts and percentages are by weight.

Example B 600 parts of 4 to 18 mesh anhydrous aluminum chloride of commercial grade were charged to a nickel reactor and heated therein while passing through the reactor a stream of anhydrous HF gas, to bring about the following reaction:

$$AlCl_3 + 3HF \rightarrow AlF_3 + 3HCl$$

The HF was admitted at a sufficiently slow rate to keep the temperature in the reaction zone (exothermic reaction) below about 90° C. to prevent excessive loss of $AlCl_3$ by volatilization. As the reaction neared completion, as evidenced by a sharp decline in reactor temperature, heat was applied externally to the reactor and temperature raised to about 300° C. while still continuing passage of a slow stream of HF through the tube, until last traces of $AlCl_3$ were converted to $AlF_3$. The $AlF_3$ so formed was then activated by heating it in a stream of air at about 450–500° C. for about 30 minutes. The size and shape of the solid material was about the same before and after treatment with gaseous HF. 500 parts of anhydrous aluminum fluoride containing 98–99% $AlF_3$ and less than 0.1% chlorine, were recovered. An X-ray diffraction pattern of the material prepared according to the latter gas phase procedure was made which indicated crystallite size to be in the range 100–200 Angstrom units radius; the average being 140 Å. radius, i. e. the crystallite size was so small as to be indicative of "amorphous" structure desired for hydrohalogenation according to the present invention.

If desired, the catalyst may be used in the form of a fluidized solid bed or suspended on a non-siliceous inert carrier such as activated alumina, activated carbon, metal fluorides or nickel. Suitable methods for preparing this suspended catalyst include dissolving the aluminum halide in a solvent therefor, applying the solution to the carrier, evaporating the solvent and then treating the carrier and supported aluminum halide with fluorinating agent. According to an alternative procedure, the aluminum halide, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a stream of nitrogen or air, condensed on the carrier, and then treated to convert it to aluminum fluoride.

Temperature in the zone of contact between HF-olefin reactant mixture and aluminum fluoride catalyst is maintained sufficiently elevated to promote the addition of HF to the double bond. When working at pressure approximating atmospheric, temperature as low as about 200° C. may be employed. The upper limit of hydrofluorination temperature is determined to some extent by convenience of operation and largely by the tendency of excessively high temperatures to reverse the desired reaction and favor severing the HF from, i. e. dehydrofluorination of, sought-for products. Generally, depending in each case to some extent upon the starting material, no particular advantages accrue by operating at temperature above about 400° C. and hence, temperatures approximating this value constitute a preferred upper limit. The invention affords the marked advantage of permitting and effecting favorable hydrofluorination rates at substantially atmospheric pressure while at the relatively low temperatures indicated. The nature of the reaction is such that the pressure maintained in the reaction zone has a significant effect upon the results obtained, elevated pressures tending to increase the rate of addition of HF to the olefin bond. Thus, elevated pressures may be used if desired in which case operating temperatures may be correspondingly lower, and reaction temperature and pressure are coordinately controlled so that their combined effect causes the addition of HF to the double bond and resulting formation of sought-for fluorinated ethane type material. By suitably elevating the pressure, to say about 20 to 40 atmospheres absolute, substantial hydrofluorination of two carbon atom olefins containing the $=CF_2$ group may be obtained at temperatures as low as about 100° C.

Generally, the process of the invention is carried out by contacting the olefinic starting material with an aluminum fluoride catalyst described above, at temperature and pressure at which hydrofluorination takes place. Operations may be suitably carried out by introducing the gaseous feed mixture of reactants into a reaction zone containing aluminum fluoride catalyst and heating said mixture at temperatures heretofore indicated for a time sufficient to convert an appreciable amount of said olefin to a sought-for fluorinated ethane, withdrawing gaseous products from the zone and recovering said fluorinated ethane from the gaseous products. Although not limited to continuous operations, the process of our invention may be advantageously carried out thereby. The reactants heretofore indicated may be diluted with other inert material, e. g. inert gas such as nitrogen, and the mixture of such inert gas and reactants introduced into the reaction zone and hydrofluorination of the olefin carried out in the presence of aluminum fluoride catalyst to produce the above noted products.

Time of contact of olefinic starting material with aluminum fluoride catalyst may be varied to some extent without noticeable sacrifice of advantageous high efficiency of operation. However, if contact time is excessive, i. e. at very low space velocities, the capacity of the reactor is low thereby causing economic disadvantages in the operation. On the other hand, if contact time is too short, i. e. at excessively high space velocities, the reaction of starting material to form desired product may be incomplete thereby entailing high cost of recovering and recycling unreacted material to subsequent operation. Accordingly, the time of contact (space velocity) is determined by balancing the economic advantage of high reactor throughput obtained at short contact times against the cost of recovery of unreacted olefin starting material. In a particular operation, optimum rate of flow of starting material through the reaction zone is dependent upon variables such as scale of operation, quantity of catalyst in the reactor, and specific apparatus employed and may be best determined by a test run.

Preferably at least one mol of HF is used for each mol of olefin starting material. Quantities of HF in excess of this amount favor, by the effect of mass action, the formation of hydrofluorinated product. However, ratios of HF to reactant should not be increased to the point where space velocity becomes an important factor in limiting reactor capacity as indicated above or cost of recovery of unreacted HF becomes burdensome. In general, molar ratios of HF to olefin in excess of about 1.5 are of no particular relative advantage. We prefer to maintain such ratios in approximate range of 1 to 1.2.

The reaction products in the reaction zone exit gas stream may be recovered in any suitable manner. The gas discharged from the reactor is cooled and recovered by scrubbing with water, aqueous caustic solution (if it is desired to remove traces of HF) then passed over calcium chloride or other drying agent to remove water, and condensed in a vessel maintained at temperature substantially below the boiling point of the lowest boiling material present, e. g. by indirect cooling of the gas in a bath of acetone and carbon dioxide ice and/or a separate bath cooled by liquid nitrogen. Particular products recovered, as indicated above, depend upon starting material treated. Individual products may be recovered, e. g. by distillation of condensates obtained above. Unreacted olefin may be recycled to subsequent operation.

Any suitable chamber or reactor tube constructed of inert material may be employed for carrying out the reaction provided the reaction space afforded is of sufficient length and cross-sectional area to accommodate the required amount of aluminum fluoride to provide adequate gas contact area and at the same time afford sufficient free space for passage of the gas mixture at an economical rate of flow. Materials such as nickel, graphite, inconel and other materials resistant to HF may be mentioned as suitable for use as reactor tube. Although, as indicated above, reactions of the type herein considered are generally exothermic, it may be necessary, depending upon the rate of operation, to provide externally disposed reactor tube heating means such as electrical resistance heaters.

The following examples illustrate practice of our invention, parts and percentages being by weight.

Example 1.—100 parts of aluminum fluoride catalyst prepared by the procedure of Example B above, were arranged in a fixed bed supported on a nickel screen in a vertically mounted 0.62 inch I. D. nickel pipe. The tube was externally electrically heated and the tube ends were fitted with pipe connections for the inlet and outlet of a gas stream and for the insertion into the nickel tube and catalyst bed of suitable thermocouples. Gaseous vinylidene fluoride of about 95% purity, and gaseous HF mixed therewith, in ratio of 1.17 mols HF per mol of $CH_2=CF_2$, were introduced into the bottom of the nickel tube and passed upwardly through the bed of $AlF_3$ catalyst. $CH_2=CF_2$ feed rate was 60 parts per hour. By adjusting the electrical heaters thereby to control the heat flow through the walls of the nickel tube, the temperature of the catalyst bed was maintained at about 300° C. Gaseous products of the reaction were withdrawn overhead, cooled, thence passed successively through a water scrubber, a caustic soda scrubber, a drier containing $CaCl_2$ as the drying agent, a condenser held at about minus 78° C. by means of an external bath of carbon dioxide ice and acetone and finally a condenser cooled with liquid nitrogen to separate the lowest boiling constituents. During a period of operation of 2 hours as described above, 127 parts of $CH_2=CF_2$ were passed through the nickel tube. The condensates from the dry ice and liquid nitrogen traps were combined and distilled and product recoveries were as follows: 22 parts unreacted $CH_2=CF_2$ (B. P. minus 83° C., present principally in the liquid nitrogen trap) and 159 parts of $CH_3CF_3$ (B. P. minus 46.8° C.). Of the total $CH_2=CF_2$ which was introduced into the reactor, 95.5% underwent reaction and yield of $CH_3CF_3$ based on the amount thereof theoretically obtainable from the $CH_2=CF_2$ converted was 99+%.

Example 2.—Gaseous $CHCl=CF_2$ mixed with gaseous HF (1.2 mols per mol of $CHCl=CF_2$) was passed through the vertical nickel tube and catalyst bed described in Example 1. Internal temperature of the tube was maintained at 300° C. and $CHCl=CF_2$ was introduced at the rate of about 94 parts per hour. Gas effluxing the nickel tube was cooled, scrubbed with water and caustic, dried and condensed by cooling with acetone and carbon dioxide ice. After so treating 188 parts of $CHCl=CF_2$ and recovering the products formed, the condensates were distilled and recoveries were as follows: 209 parts $CH_2ClCF_3$ (B. P. plus 5.5° C.); and 10 parts of unidentified material (B. P. minus 46 to plus 5° C.). No unreacted $CHCl=CF_2$ was recovered. Yield of sought-for $CH_2ClCF_3$ based on the $CHCl=CF_2$ converted was 92%.

Example 3.—5 parts of anhydrous HF were condensed into a 200 cc. volume pressure reactor containing 50 parts $AlF_3$ catalyst prepared by the method of Example B, equipped with a pressure gauge and supplied with a feed pipe through which $CH_2=CF_2$ could be introduced. The closed reactor was heated to 110° C., developing a pressure of about 200 p. s. i. gauge. $CH_2=CF_2$ was then fed into the reactor until the total pressure reached 600 p. s. i. gauge. Reactor pressure decreased as reaction took place and hence additional $CH_2=CF_2$ was added to increase the pressure to 600 p. s. i. gauge. Thereafter at intervals over a period of an hour, additional $CH_2=CF_2$ was introduced to the reactor. At the end of the hour, gases were vented from the reactor through a water scrubber, $CaCl_2$ drier and condensed at minus 78° C. Unreacted $CH_2=CF_2$ was permitted to pass uncondensed through the cold condenser. 15 parts of product boiling at minus 47° C., identified as $CH_3CF_3$, were collected. Of the total HF fed 72% was converted into $CH_3CF_3$.

We claim:

1. The process of contacting a gaseous mixture of HF and a two carbon atom olefin containing the $=CF_2$ group with aluminum fluoride having crystallite size not substantially greater than about 500 Angstrom units radius at reactive temperature in the approximate range of 100–400° C.

2. The process for producing a fluorinated ethane having at least two fluorine atoms attached to the same carbon atom by hydrofluorination of an olefin which comprises heating a gaseous mixture of HF and a two carbon atom olefin containing the $=CF_2$ group in the presence of aluminum fluoride having crystallite size not substantially greater than about 500 Angstrom units radius, at temperature above about 100° C. and at which hydrofluorination takes place and pressure sufficiently high to cause hydrofluorination of said olefin, and for time sufficient to hydrofluorinate a substantial amount of said olefin to form said fluorinated ethane.

3. The process for producing a fluorinated ethane having at least two fluorine atoms attached to the same carbon atom by hydrofluorination of an olefin which comprises heating a gaseous mixture of HF and a two carbon atom olefin containing the $=CF_2$ group in the presence of aluminum fluoride having crystallite size not substantially greater than about 200 Angstrom units radius, at temperature in the approximate range 100 to 400° C. and pressure sufficiently high to cause hydrofluorination of said olefin, and for time sufficient to hydrofluorinate a substantial amount of said olefin to form said fluorinated ethane.

4. The process for hydrofluorinating a compound of the group consisting of $CH_2=CF_2$ and $CHCl=CF_2$ which comprises heating a gaseous mixture of HF and said compound in the presence of aluminum fluoride having crystallite size not substantially greater than about 500 Angstrom units radius, at temperature in the approximate range 200 to 400° C. for time sufficient to hydrofluorinate a substantial amount of said compound.

5. The process for producing a fluorinated ethane having at least two fluorine atoms attached to the same carbon atom by hydrofluorination of $CH_2=CF_2$ which comprises heating a gaseous mixture of HF and $CH_2=CF_2$ in the presence of aluminum fluoride having crystallite size not substantially greater than about 200 Angstrom units radius, at temperature in the approximate range 100 to 400° C. and pressure sufficiently high to cause hydrofluorination of said $CH_2=CF_2$, and for time sufficient to hydrofluorinate a substantial amount of said $CH_2=CF_2$ to form said fluorinated ethane.

6. The process for producing a fluorinated ethane having at least two fluorine atoms attached to the same carbon atom by hydrofluorination of $CHCl=CF_2$ which comprises heating a gaseous mixture of HF and $CHCl=CF_2$ in the presence of aluminum fluoride having crystallite size not substantially greater than about 200 Angstrom units radius, at temperature in the approximate range 100 to 400° C. and pressure sufficiently high to cause hydrofluorination of said $CHCl=CF_2$, and for time sufficient to hydrofluorinate a substantial amount of said $CHCl=CF_2$ to form said fluorinated ethane.

7. The process for producing a fluorinated ethane having at least two fluorine atoms attached to the same carbon atom by hydrofluorination of an olefin which comprises introducing a stream of gaseous mixture of HF and a two carbon atom olefin containing the $=CF_2$ group, in respective molar proportions in the range substantially 1:1 to 1.5:1 into a reaction zone containing aluminum fluoride having crystallite size not substantially greater than about 500 Angstrom units radius, contacting said mixture with said aluminum fluoride in said zone at temperature in the approximate range of 100 to 400° C. while controlling the pressure of said stream and said mixture in contact with said aluminum fluoride to cause addition of HF to the double bond of said olefin, continuing said contact for time sufficient to hydrofluorinate said olefin to form a gaseous reaction product comprising said fluorinated ethane, withdrawing said gaseous product from said zone and recovering said fluorinated ethane from said gaseous product.

8. The process for producing a 1,1,1-trifluoroethane by hydrofluorination of a compound of the group consisting of $CH_2=CF_2$ and $CHCl=CF_2$ which comprises continuously introducing a stream of gaseous mixture of HF and said compound in respective molar proportions in the range substantially 1:1 to 1.5:1, into a reaction zone containing aluminum fluoride having crystallite size not substantially greater than about 200 Angstrom units radius, contacting said mixture with said aluminum fluoride in said zone at temperature in the approximate range 100 to 400° C. while controlling the pressure of said stream and said mixture in contact with said aluminum fluoride to cause addition of HF to the double bond of said olefin, continuing said contact for time sufficient to hydrofluorinate said compound to form a gaseous reaction product comprising a 1,1,1-trifluroethane, continuously withdrawing said gaseous product from said zone and recovering said 1,1,1-trifluoroethane from said gaseous product.

9. The process for producing a 1,1,1-trifluoroethane by hydrofluorination of a compound of the group consisting of $CH_2=CF_2$ and $CHCl=CF_2$ which comprises continuously introducing a stream of gaseous mixture of HF and said compound in respective molar proportions in the range substantially 1:1 to 1.2:1, into a reaction zone containing aluminum fluoride having crystallite size not substantially greater than about 500 Angstrom units radius, contacting said mixture with said aluminum fluoride in said zone at temperature in the approximate range 200 to 400° C. at substantially atmospheric pressure for time sufficient to hydrofluorinate said compound to form a gaseous reaction product comprising a 1,1,1-trifluoroethane, continuously withdrawing said gaseous product from said zone and recovering said 1,1,1-trifluoroethane from said gaseous product.

10. The process for producing $CH_3-CF_3$ by hydrofluorination of $CH_2=CF_2$, which comprises continuously introducing a stream of gaseous mixture of HF and $CH_2=CF_2$ in respective molar proportions in the range substantially 1:1 to 1.2:1, into a reaction zone containing aluminum fluoride having crystallite size not substantially greater than about 200 Angstrom units radius, contacting said mixture with said aluminum fluoride in said zone at temperature in the approximate range 200 to 400° C. at substantially atmospheric pressure for time sufficient to hydrofluorinate said $CH_2=CF_2$ to form a gaseous reaction product comprising $CH_3-CF_3$, continuously withdrawing said gaseous product from said zone and recovering said $CH_3-CF_3$ from said gaseous product.

11. The process for producing $CH_2Cl-CF_3$ by hydrofluorination of $CHCl=CF_2$, which comprises continuously introducing a stream of gaseous mixture of HF and $CHCl=CF_2$ in respective molar proportions in the range substantially 1:1 to 1.2:1, into a reaction zone containing aluminum fluoride having crystallite size not substantially greater than about 200 Angstrom units radius, contacting said mixture with said aluminum fluoride in said zone at temperature in the approximate range 200 to 400° C. at substantially atmospheric pressure for time sufficient to hydrofluorinate said $CHCl=CF_2$ to form a gaseous reaction product comprising $CH_2Cl-CF_3$, continuously withdrawing said gaseous product from said zone and recovering said $CH_2Cl-CF_3$ from said gaseous product.

CHARLES B. MILLER.
LEE B. SMITH.

References Cited in the file of this patent
UNITED STATES PATENTS

| Number | Name | Date |
|---|---|---|
| 1,996,115 | Lazier | Apr. 2, 1935 |
| 2,466,189 | Waalkes | Apr. 5, 1949 |
| 2,471,525 | Hillyer et al. | May 31, 1949 |